(12) United States Patent
Hsu et al.

(10) Patent No.: US 7,067,991 B2
(45) Date of Patent: Jun. 27, 2006

(54) FEEDBACK SAMPLING CONTROL CIRCUIT FOR LAMP DRIVING SYSTEM

(75) Inventors: Cheng-Chia Hsu, Nantou (TW);
Yu-Cheng Pan, Taipei (TW);
Chia-Yuan Chen, Sindian (TW);
Jong-Chi Tseng, Pingjhen (TW);
Teng-Ho Wu, Yongkang (TW)

(73) Assignee: Logah Technology Corp. (TW)

( * ) Notice: Subject to any disclaimer, the term of this patent is extended or adjusted under 35 U.S.C. 154(b) by 0 days.

(21) Appl. No.: 11/067,371

(22) Filed: Feb. 28, 2005

(65) Prior Publication Data
US 2005/0206327 A1   Sep. 22, 2005

(30) Foreign Application Priority Data
Mar. 18, 2004   (TW) ............................... 93107234 A

(51) Int. Cl.
*H05B 37/02* (2006.01)
(52) U.S. Cl. ...................... 315/224; 291/225; 291/307; 291/DIG. 4
(58) Field of Classification Search ................ 315/224, 315/225, 291, 307, 219, 209 R, 276, DIG. 4, 315/DIG. 7; 363/17, 26, 41, 132
See application file for complete search history.

(56) References Cited

U.S. PATENT DOCUMENTS

| 6,108,215 A | * | 8/2000 | Kates et al. | ................... 363/17 |
| 6,337,544 B1 | * | 1/2002 | Wang et al. | ................. 315/291 |
| 6,864,644 B1 | * | 3/2005 | Kernahan | ................... 315/307 |

\* cited by examiner

*Primary Examiner*—Haissa Philogene
(74) *Attorney, Agent, or Firm*—Michael Bednarek; Pillsbury Winthrop Shaw Pittman LLP

(57) ABSTRACT

The invention discloses a feedback sampling control circuit for a lamp driving system having a feedback loop, in that the feedback sampling control circuit includes a switch and an effective current sampling controller. The switch is electrically coupled in the feedback path of the lamp driving system. The effective current sampling controller controls switching of the switch based on a voltage or current signal from a high voltage terminal of the lamp, such that an effective current actually sampled by a feedback controller in the lamp driving system is controlled so that a current component of a parasitic capacitance contained in the effective current is minimized. Thereby, the disadvantage caused by the leakage current through the parasitic capacitance can be eliminated and it is thus possible to precisely control the lamp current and to obtain a stable brightness quality.

28 Claims, 12 Drawing Sheets

FEEDBACK SAMPLING CONTROL CIRCUIT FOR LAMP DRIVING SYSTEM

BACKGROUND OF THE INVENTION (a) Field of the Invention

The invention relates to a lamp driving system, and more particularly, to an inverter circuit for driving a discharge lamp of a liquid crystal display panel with a feedback loop for adjusting a current flowing through the lamp.

(b) Description of the Prior Art

A discharge lamp, especially a cold cathode fluorescent lamp (CCFL), has excellences of high efficiency and law cost, and is therefore extensively applied to liquid crystal displays (LCD) to serve as a light source of a backlight system. An inverter circuit is used for driving such CCFL, and is capable of supplying an extremely high excitation voltage as well as reducing the supply voltage to a smaller operating voltage when the lamp is illuminated.

Referring to FIG. 1 showing a schematic circuit diagram of a conventional lamp driving system, an inverter 10 comprises a driving circuit 12 and a transformer 14. The driving circuit 12 is for converting a DC power source to an AC signal that are boosted by the transformer 14 to produce an AC power source further forwarded to a lamp 20. At this point, the inverter 10 has an output voltage $V_{OUT}$ and an output current $I_{OUT}$.

To accurately control brightness of the lamp 20, and taken into consideration that brightness of the lamp is approximately proportional to a current flowing through the lamp, a lamp driving system is provided with a current feedback loop as basis for adjusting the current of the lamp. Generally, the feedback loop uses a pulse-width modulation (PWM) controller 16 to produce a feedback control signal to the driving circuit 12 based on $I_{OUT}$ sampled from a secondary side of the transformer 14. The feedback control signal thus controls duty cycles of the driving circuit 12 so as to adjust an average output current of the inverter 10.

However, as shown in FIG. 1, inherent parasitic capacitance $C_1$ is present at the lamp 20. In addition, when the lamp 20 is installed to a housing of the LCD panel, between any high voltage terminals (lamp) to a ground terminal (panel housing) is distributed stray capacitance $C_{21}$, $C_{22}$ ... $C_{2n}$—the parasitic capacitance respectively leads to leakage currents $I_1$ and $I_2$. It is concluded that, in the lamp driving system shown in FIG. 1, the current $I_{OUT}$ outputted from the inverter 10 is not actually the current $I_L$ flowing through the lamp; instead, the current $I_{OUT}$ is a sum of the lamp current $I_L$, and the leakage currents $I_1$ and $I_2$.

The parasitic capacitance increases as the length of the lamp lengthens, and the larger the parasitic capacitance is, the higher the leakage current gets. Wherein, the leakage current $I_2$ especially has a greater influence. Moreover, when the lamp 20 is installed to the housing of the LCD panel, even minute errors of installation lead to a significant inherent stray capacitance differences. Under normal circumstances, the leakage current $I_2$ may be as high as 30% to 50% of the output current $I_{OUT}$ of the inverter 10.

FIG. 2 shows a waveform diagram of relative voltage and current signals of the lamp driving system circuit in FIG. 1. The lamp is a resistive load, with the current $I_L$ and the voltage $V_{OUT}$ of the high voltage terminal of the lamp being same phase, and the leakage currents $I_1$ and $I_2$ having 90 degrees phase difference from the voltage $V_{OUT}$. Therefore, a phase difference between the current $I_{OUT}$ and the voltage $V_{OUT}$ ranges between 0 to 90 degrees.

In the conventional lamp driving system shown in FIG. 1, a feedback sampling method samples within an extremely short time at the peak point $P_1$ of the current $I_{OUT}$ as shown in FIG. 2, and another feedback sampling method samples during an entire positive semi-circle of the current $I_{OUT}$ as shown in FIG. 2(e). Regardless which method is adopted, the sampled current contains a certain percentage of leakage current, and the actual current $I_L$ flowing through the lamp remains unobtainable. Thus, such feedback control method fails to ensure precise brightness control to incur noticeable brightness differences of the lamp.

To overcome the aforesaid drawbacks, another conventional lamp driving system in FIG. 3 is used. Referring to FIG. 3, a low voltage terminal of a lamp 20 serves as a feedback point to form a feedback loop. In such conditions, a sampled current received by the PWM controller 16 is $I_L + I_1$. Although influences of the leakage current $I_2$ is eliminated, this method is yet is incapable of sampling the actual current $I_L$ of the lamp in a most precise manner. Furthermore, in numerous designs of LCD panels, such sampling feedback method that samples from low voltage terminal of the lamp is not permitted. Therefore, it is vital to develop other feedback control techniques for solving the aforesaid issues.

SUMMARY OF THE INVENTION

The object of the invention is to provide a feedback sampling control circuit for a lamp driving system, in that the feedback sampling control circuit precisely samples a current flowing through the lamp without being affected by a parasitic capacitance of the lamp, and a feedback path can be electrically coupled to either a low voltage terminal of the lamp or a high voltage terminal of the lamp.

A feedback sampling control circuit for a lamp driving system having a feedback loop according to the invention comprises a switch and an effective current sampling controller. The feedback controller produces a feedback signal to an inverter based on a sampling current at a feedback point of the lamp driving system, thereby adjusting an AC power source from the inverter to a lamp.

A feedback sampling control circuit in a first embodiment according to the invention comprises a switch electrically coupled between a feedback controller and a feedback point; and an effective current sampling controller electrically coupled to a high voltage terminal of the lamp and the switch. The effective current sampling controller produces a sampling signal based a voltage from the high voltage terminal of the lamp to control switching of the switch, thereby minimizing a current component of a parasitic capacitance contained in the effective current from the sampling current received by the feedback controller.

A feedback sampling control circuit in a second embodiment according to the invention comprises a switched electrically coupled between a feedback controller and a feedback point; a capacitive load electrically coupled between a high voltage terminal of a lamp and ground; and an effective current sampling controller electrically coupled to the capacitive load and the switch. The effective current sampling controller produces a sampling control signal based a current flowing through the capacitive load to control switching of the switch, thereby minimizing a current component of a parasitic capacitance contained in the effective current from the sampling current received by the feedback controller.

According to the aforesaid structure, a current component of a parasitic capacitance approaches zero or equals to zero.

In other words, the effective current sampled by the feedback controller approaches or equals to a lamp current. Therefore, without using a low voltage terminal of a lamp as a feedback point, influences of a leakage current caused by a parasitic capacitance of the lamp upon the feedback controller are effectively reduced to ensure precise control over a lamp current, thereby overcoming an issue of lamp brightness differences of the prior art.

DETAILED DESCRIPTION OF THE PREFERRED EMBODIMENTS

To better understand technical contents of the invention, detailed descriptions shall be given with the accompanying drawings below.

Figure 1:
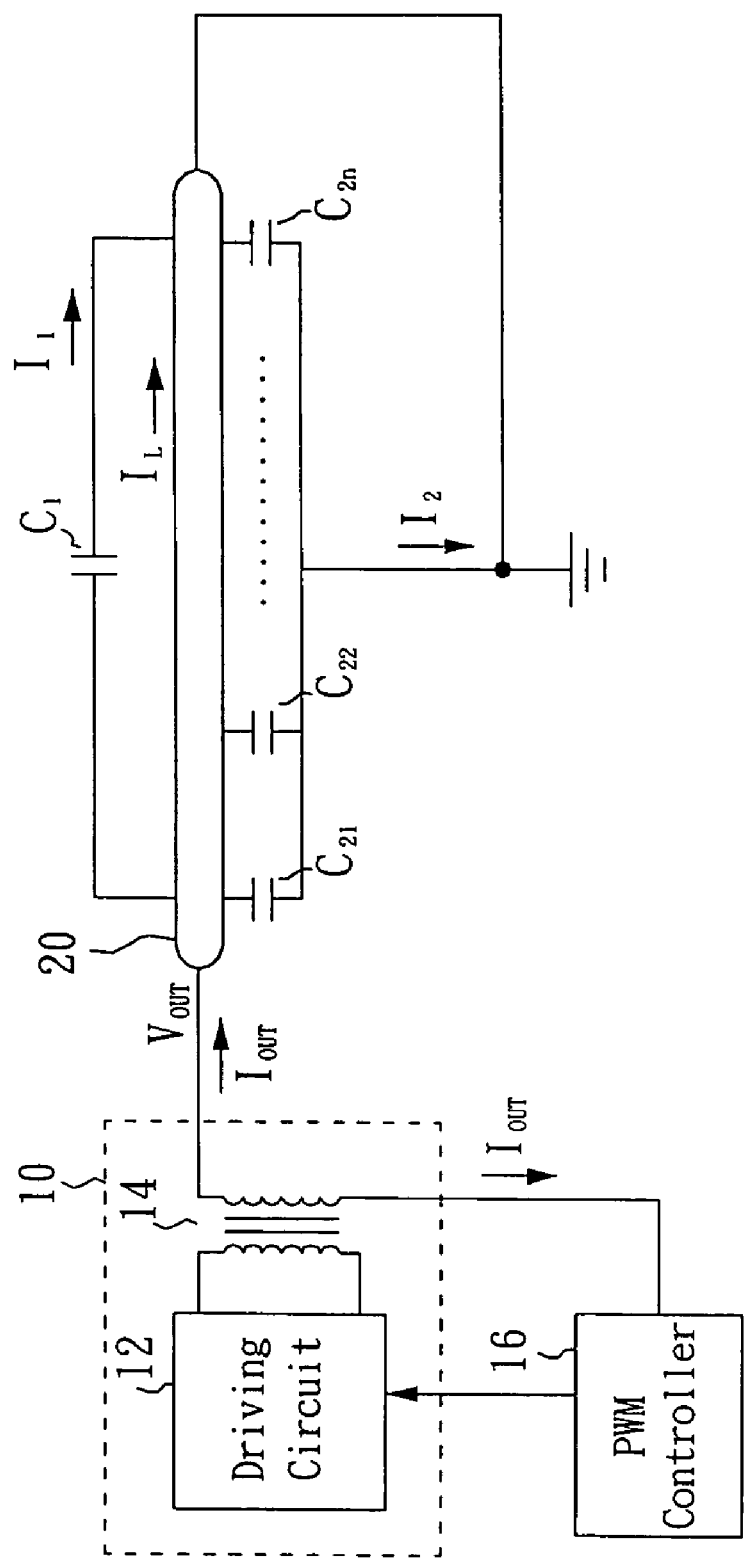
FIG. 1 shows a schematic circuit diagram of a conventional lamp driving system.
Figure 2:
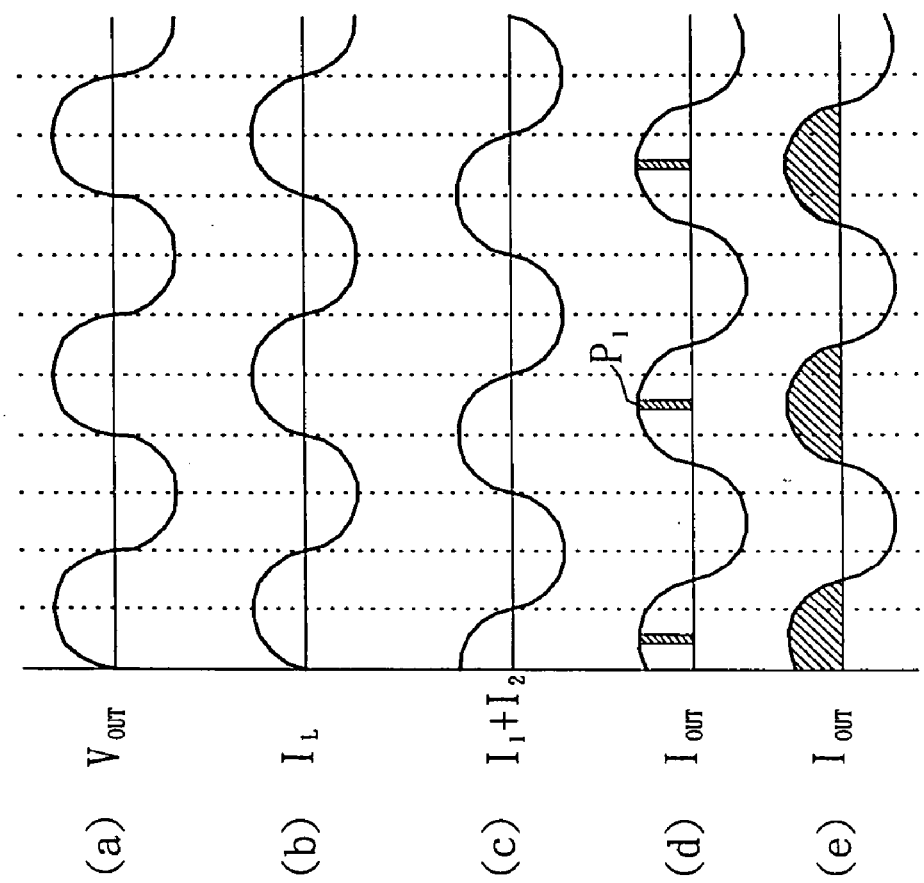
FIG. 2 shows a waveform diagram of relative voltage and current signals of the lamp driving system circuit in FIG. 1.
Figure 3:
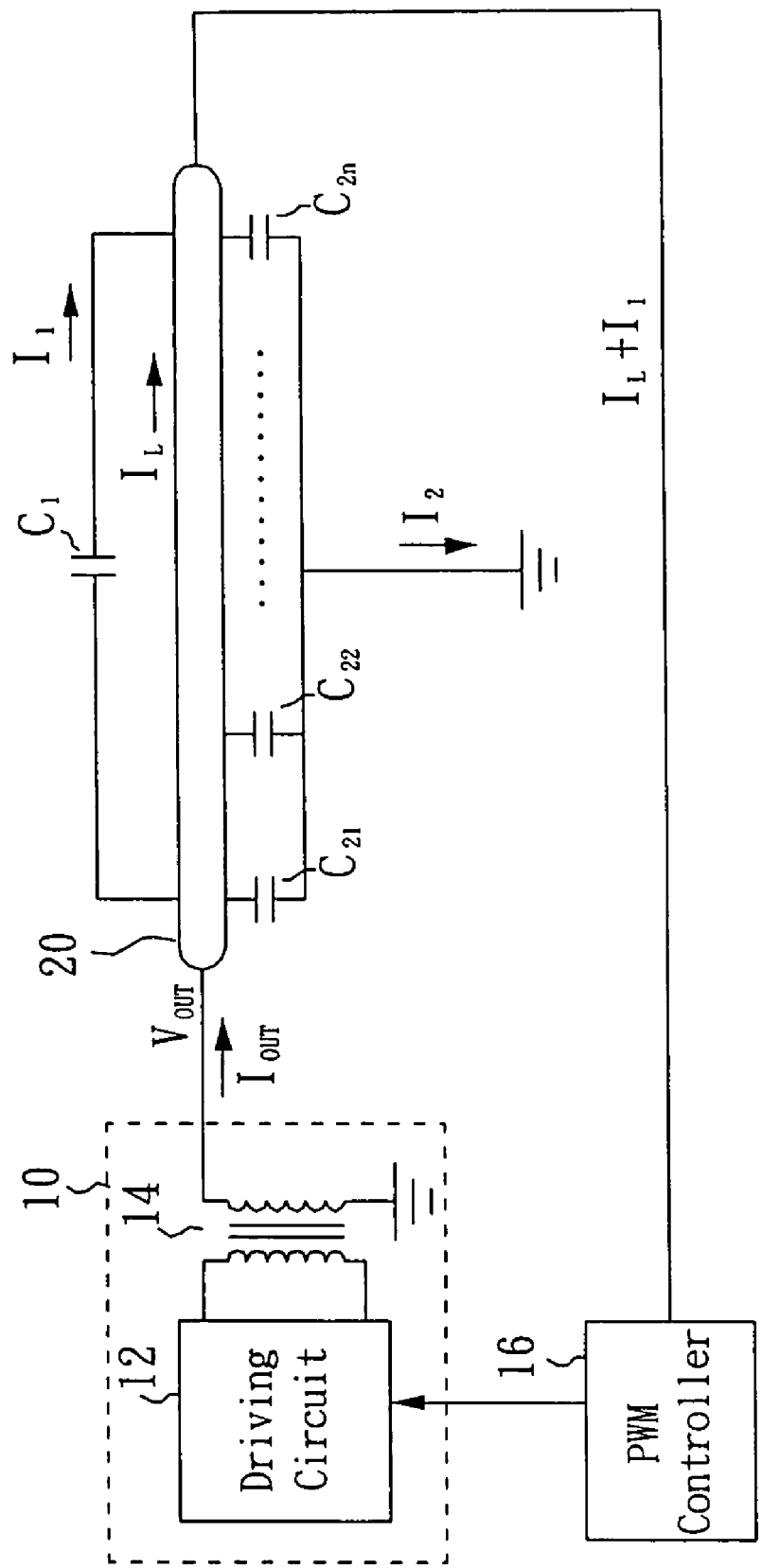
FIG. 3 shows a schematic circuit diagram of another conventional lamp driving system.
Figure 4:
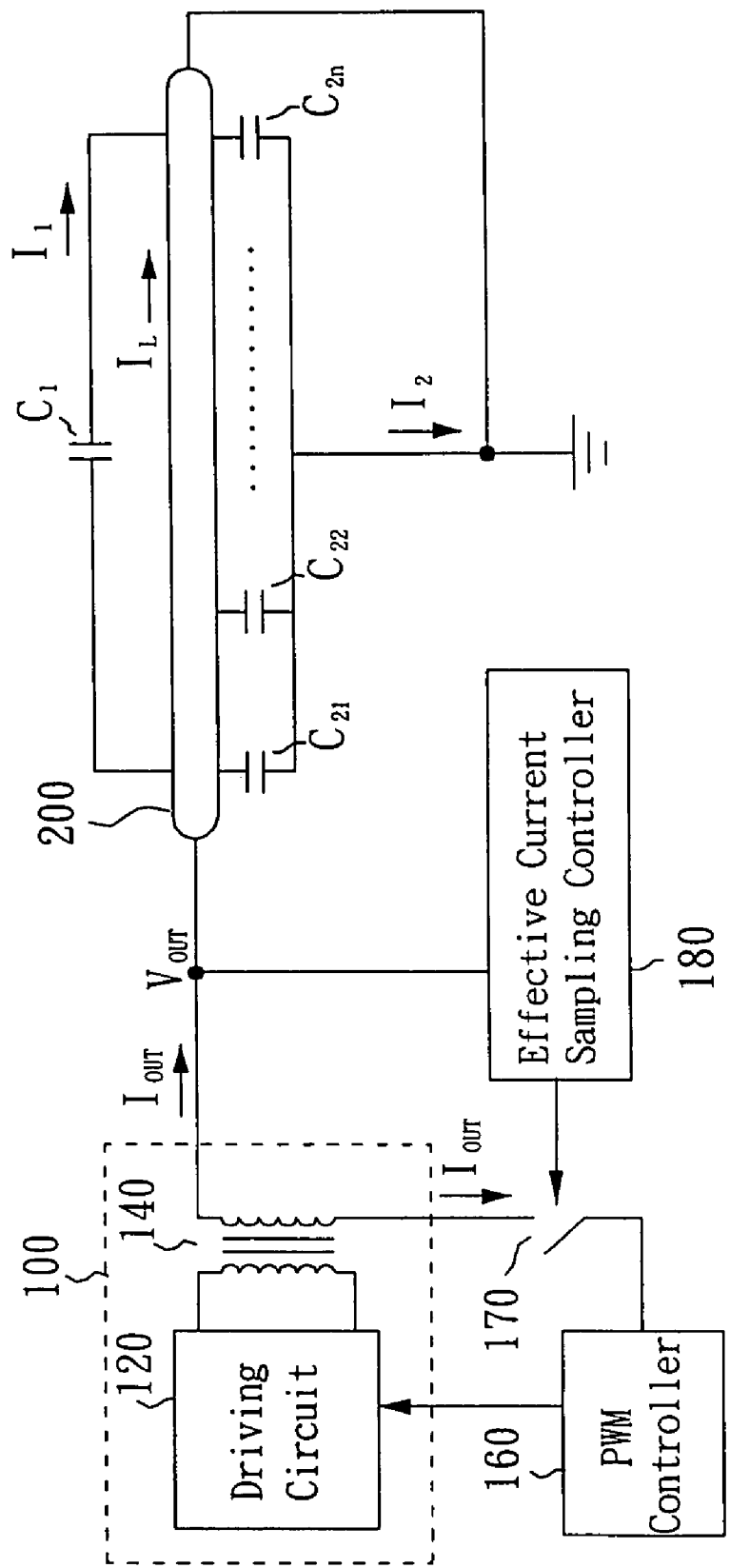
FIG. 4 shows a schematic circuit diagram of a feedback sampling control circuit for a lamp driving system in a first embodiment according to the invention.

FIG. 4 shows a schematic circuit diagram of a feedback sampling control circuit for a lamp driving system in a first embodiment according to the invention.

In the lamp driving system in FIG. 4, an inverter 100 comprises a driving circuit 120 and a transformer 140. The driving circuit 120 is for converting a DC power to an AC signal, which is boosted by the transformer 140 to produce an AC power further supplied to a lamp 200. At this point, an output voltage of the inverter 100 is $V_{OUT}$, and an output current is $I_{OUT}$. A PWM controller 160 then produces a feedback control signal to the driving circuit 120 based on $I_{OUT}$ sampled from a secondary side of the transformer 140, thereby adjusting output of the inverter 100. As described in the above, parasitic capacitances $C_1$, $C_{21}$, $C_{22}$ ... $C_{2n}$ are present at the lamp, and hence the current $I_{OUT}$ contains a lamp current component $I_L$ and a current component $I_1+I_2$ of parasitic capacitance. The feedback sampling control circuit according to the invention enables the PWM controller 160 to merely sample an effective current of the sampling current $I_{OUT}$. The current component $I_1+I_2$ of the parasitic capacitance in the effective current can be minimized and even totally eliminated to leave only the lamp current component $I_L$.

In the first embodiment according to the invention, a feedback sampling circuit comprises a switch 170 and an effective current sampling controller 180. The switch 170 is provided in a feedback path of the lamp driving system. That is, the switch 170 is electrically coupled between a secondary side of the transformer 140 and the PWM controller 160. Based on the aforesaid arrangement, the sampling current $I_{OUT}$ flowing through is regarded as an effective current only when the switch 170 is switched on. The effective current sampling controller 180 has an input end thereof electrically coupled to a high voltage terminal of the lamp 200, and an output end thereof electrically coupled to control the switch 170, such that a sampling control signal is produced based on a voltage $V_{OUT}$ from the high voltage terminal of the lamp 200 and forwarded to the switch 170 to control switching of the switch 170.

In actual operations, a MOS transistor can be used as the switch 170.

Figure 5:
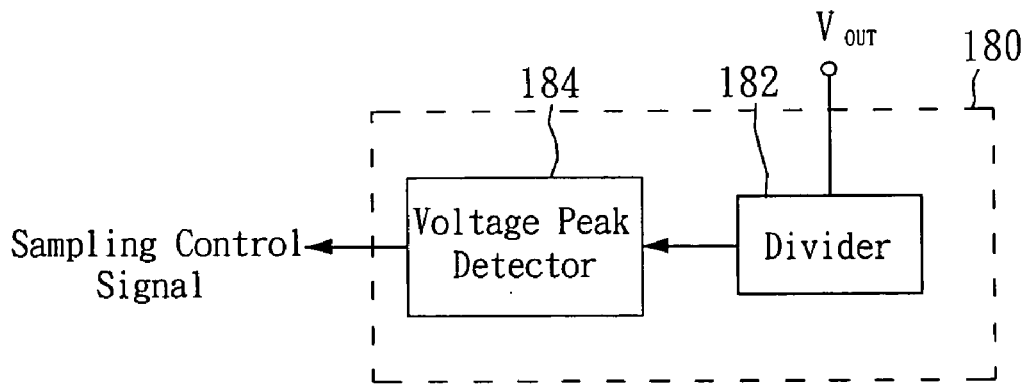
FIG. 5 shows a first exemplary circuit of an effective current sampling controller in FIG. 4.

Referring to FIG. 5 showing a first exemplary circuit of the effective current sampling controller 180, the effective current sampling controller 180 has a divider 182 and a voltage peak detector 184. Operations of the circuit shall be described with reference to FIG. 6 showing a waveform diagram of relative voltage and current signals.

First of all, the voltage $V_{OUT}$ from the high voltage terminal of the lamp 200 is appropriately divided using the divider 182, followed by measuring a positive peak value point P2 of the voltage $V_{OUT}$ by the voltage peak detector 184. When having detected a positive peak value, the voltage peak detector 184 outputs a logic high voltage signal as a sampling control signal for switching on the switch 170; otherwise, the voltage peak detector 184 outputs a logic low voltage signal as a sampling control signal for switching off the switch. Thus, within an extremely short time ΔT during the positive peak value point P2 of the voltage $V_{OUT}$, the switch 170 is switched on in order to allow the PWM controller 160 to sample. To be more precise, a current $I_{OUT}$ at this point is an effective current.

Figure 6:
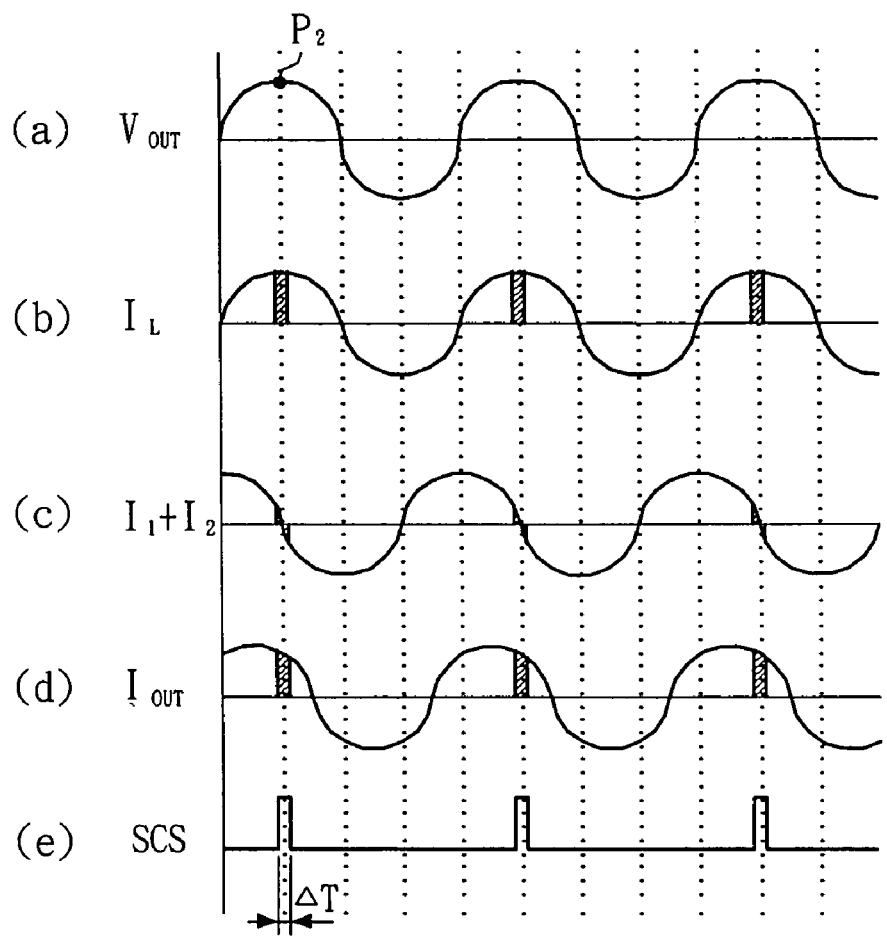
FIG. 6 shows a waveform diagram of relative voltage and current signals when the lamp driving system in FIG. 4 uses the effective current sampling controller in FIG. 5.

Referring to waveforms in FIG. 6, a phase of the leakage current $I_1+I_2$ of a parasitic capacitance is ahead of that of the voltage $V_{OUT}$ by 90 degrees, and therefore the positive peak value point P2 of the voltage $V_{OUT}$ is exactly corresponded to a zero point of the leakage current $I_1+I_2$. It is observed that, within the extremely short time ΔT during the positive peak value point P2, the leakage current $I_1+I_2$ approaches zero, thereby minimizing the current component of the parasitic capacitance in the effective current. In other words, the effective current sampled by the PWM controller 160 is approximately to the lamp current $I_L$.

Figure 7:
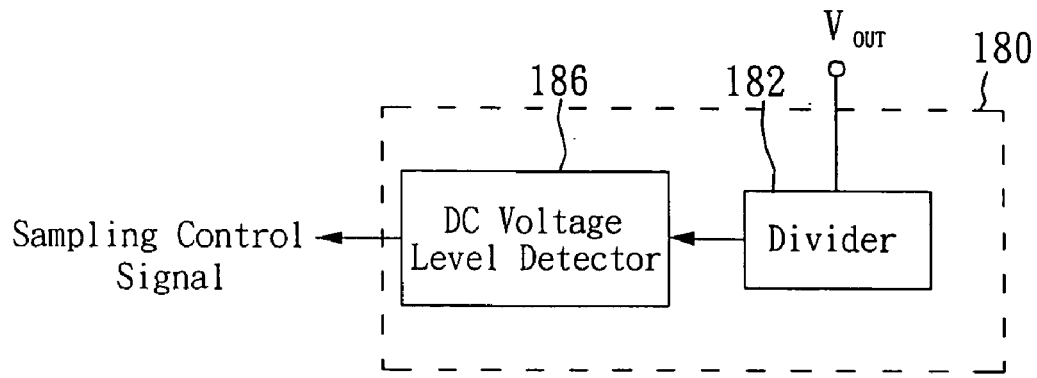
FIG. 7 shows a second exemplary circuit of an effective current sampling controller in FIG. 4.

Referring to FIG. 7 showing a second exemplary circuit of the effective current sampling controller 180, the effective current sampling controller 180 has a divider 182 and a DC voltage level detector 186. Operations of the circuit shall be described with reference to FIG. 8 showing a waveform diagram of relative voltage and current signals.

First of all, the voltage $V_{OUT}$ at the high voltage terminal of the lamp 200 is appropriately divided using the divider 182. A divided signal is fed into the DC voltage level detector 186, and is compared with a reference voltage. Supposed the fed in voltage signal is higher than the reference voltage, the DC voltage level detector 186 outputs a logic high voltage signal as a sampling control signal for switching on the switch 170; otherwise, the DC voltage level detector 186 outputs a logic low voltage signal as a sampling control signal for switching off the switch 170.

Figure 8:
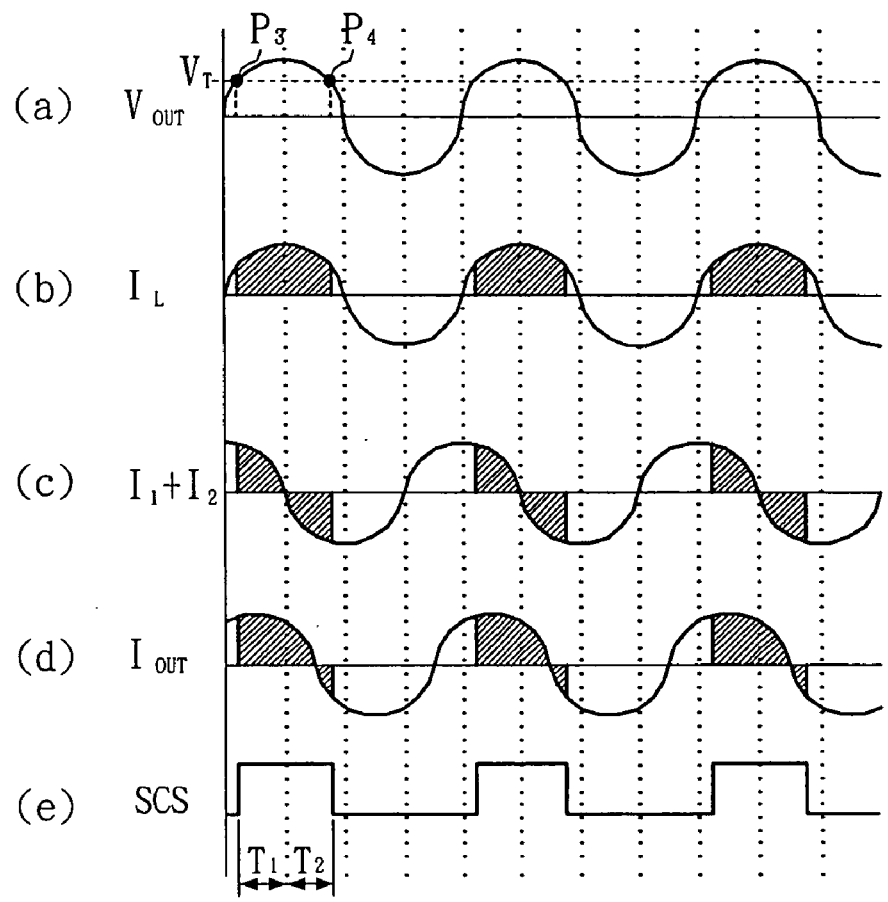
FIG. 8 shows a waveform diagram of relative voltage and current signals when the lamp driving system in FIG. 4 uses the effective current sampling controller in FIG. 7.

Thus, with reference to the waveforms in FIG. 8, when the voltage $V_{OUT}$ is higher than a predetermined voltage $V_T$, that is, within the time $T_1+T_2$ between points P3 and P4, the switch 170 is switched on such that PWM controller 160 is enabled to sample within two same time points ($T_1=T_2$) from the zero point of the leakage current $I_1+I_2$ of the parasitic capacitance. Therefore, within the period $T_1+T_2$, an effective current sampled by the PWM controller 160 exactly equals to the lamp current $I_L$.

Figure 9:
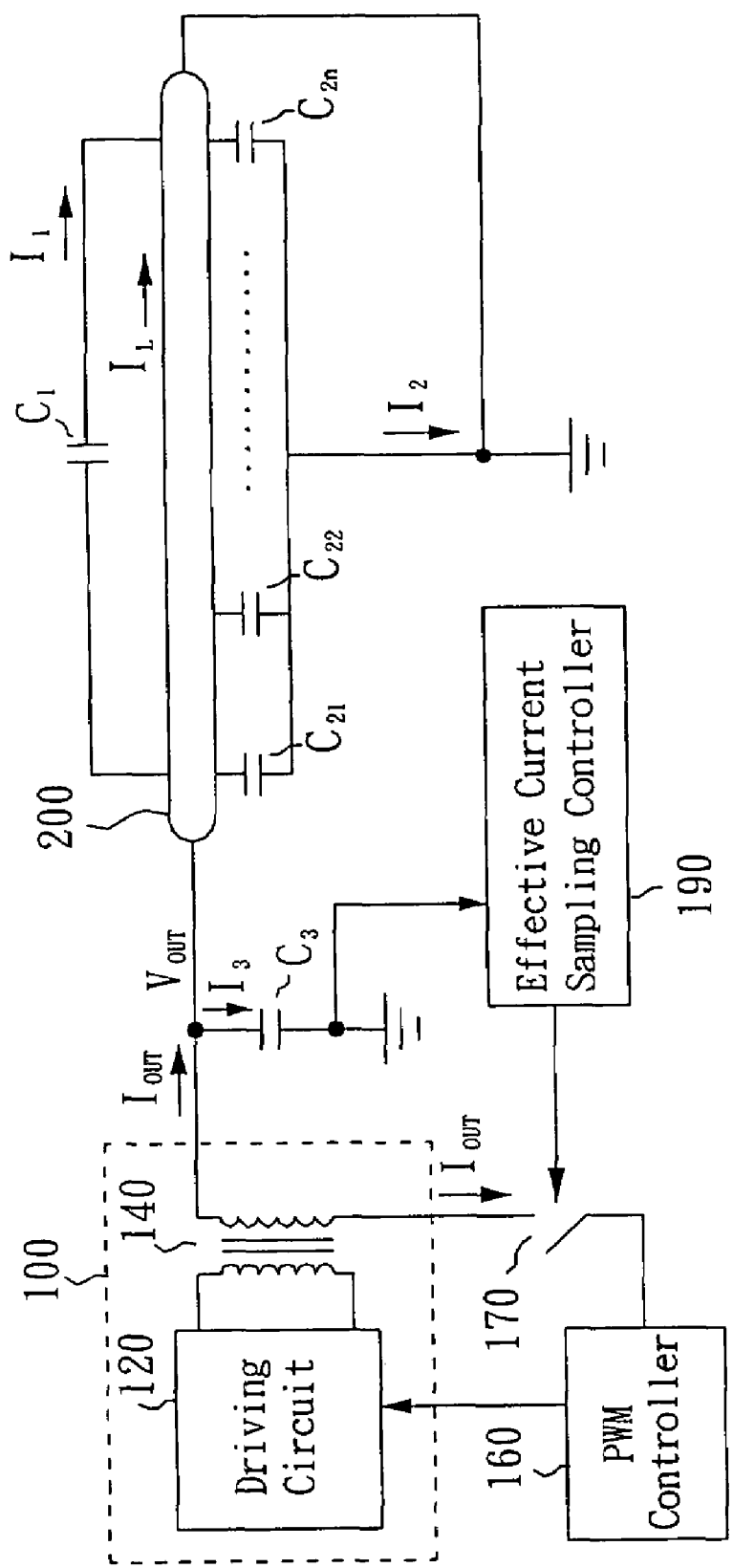
FIG. 9 shows a schematic circuit diagram of a feedback sampling control circuit for a lamp driving system in a second embodiment according to the invention.

FIG. 9 shows a schematic circuit diagram of a feedback sampling control circuit for a lamp driving system in a second embodiment according to the invention. In the lamp driving system shown in FIG. 9, the inverter 100 and the PWM controller 160 have structures identical to those shown in FIG. 4, and shall not be further described.

In the second embodiment according to the invention, a feedback sampling control circuit comprises a switch 170, a capacitor $C_3$, and an effective current sampling controller 190. The switch 170 is provided in a feedback path of the lamp driving system. That is, the switch 170 is electrically coupled between a secondary side of the transformer 140 and the PWM controller 160. Equivalent to the circuit in FIG. 4, a sampling current $I_{OUT}$ flowing through is an effective current only when the switch 170 is switched on. The capacitor $C_3$ is coupled between the high voltage terminal of the lamp 200 and ground, so as to facilitate inducing a current $I_3$ from the current $I_{OUT}$, wherein the current $I_3$ has a phase same as that of the parasitic capacitance current. The effective current sampling controller 190 has an input end thereof electrically coupled to the capacitor $C_3$, and an output end thereof electrically coupled to the switch 170, such that a sampling control signal is produced based on the current $I_3$ flowing through the capacitor $C_3$ and forwarded to the switch 170 to control switching of the switch 170.

Unlike the first embodiment, in the second embodiment, the output current $I_{OUT}$ from the inverter 100 is a sum of the lamp current $I_L$, the capacitor current $I_3$, and the parasitic capacitance currents $I_1$ and $I_2$.

Figure 10:
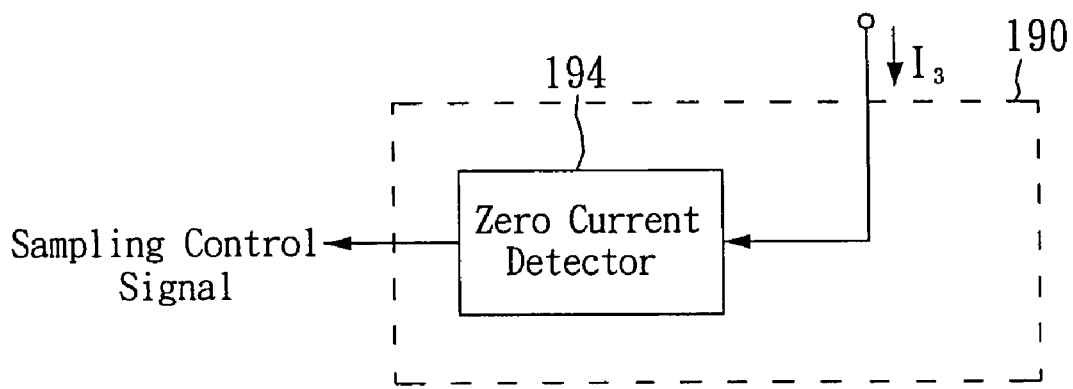
FIG. 10 shows a first exemplary circuit of an effective current sampling controller in FIG. 9.
Figure 11:
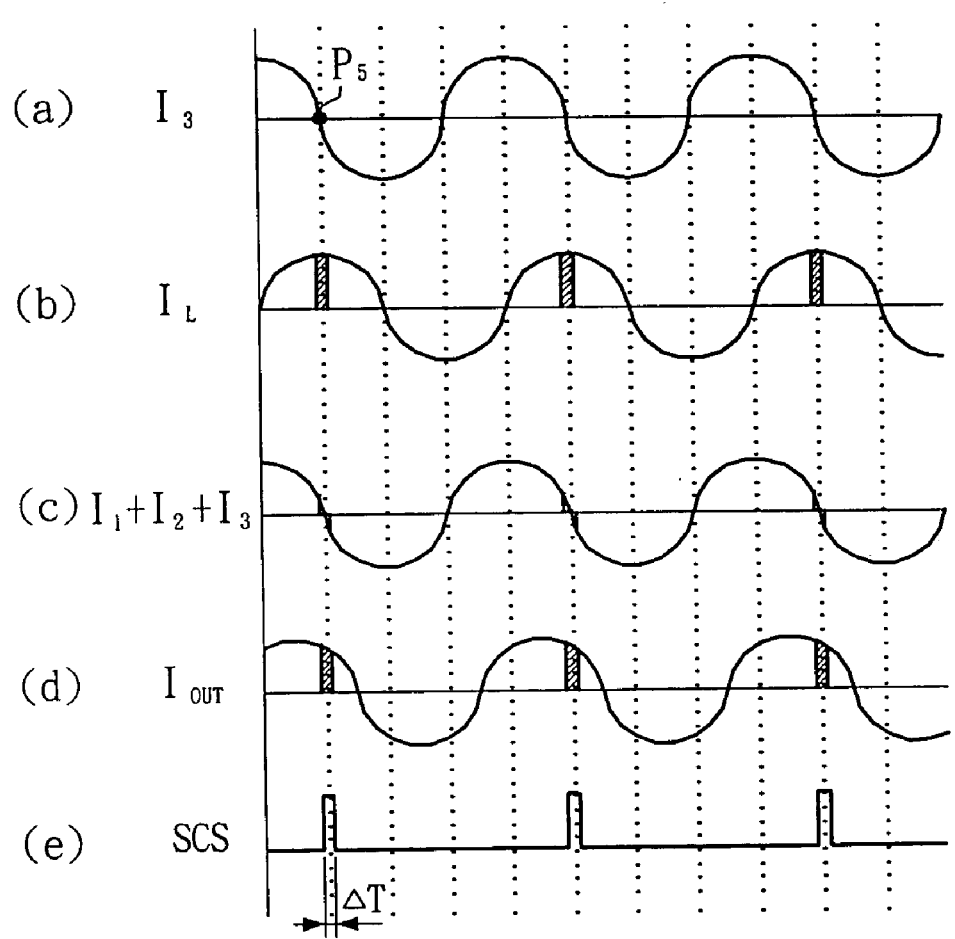
FIG. 11 shows a waveform diagram of relative voltage and current signals when the lamp driving system in FIG. 9 uses the effective current sampling controller in FIG. 10.

Referring to FIG. 10 showing a first exemplary circuit of the effective current sampling controller 190, the effective current sampling controller 190 has a zero current detector 194. Operations of the circuit shall be described with reference to FIG. 11 showing a waveform diagram of relative voltage and current signals.

The zero current detector 194 is for detecting a zero value when the current $I_3$ flows through the capacitor $C_3$ from a positive value to a negative value. When a zero value is detected, the zero current detector 194 outputs a logic high voltage signal as a sampling control signal for switching on the switch 170; otherwise, the zero current detector 194 outputs a logic low voltage signal as a sampling control signal for switching off the switch. Thus, within an extremely short time $\Delta T$ during a zero point P5 of the current $I_3$, the switch 170 is switched on in order to allow the PWM controller 160 to sample. To be more precise, a current $I_{OUT}$ at this point is an effective current.

Referring to waveforms in FIG. 9, a phase of the current $I_3$ flowing through the capacitor $C_3$ is ahead of that of the voltage $V_{OUT}$ by 90 degrees, that is, the current $I_3$ flowing through the capacitor $C_3$ is in a same phase as the leakage currents $I_1$ and $I_2$ flowing thorough the parasitic capacitance. Therefore the zero point P5 of the current $I_3$ is the zero point of the leakage current $I_1+I_2$. It is observed that, within the extremely short time $\Delta T$ at the zero point P5, the currents $I_1$, $I_2$ and $I_3$ approach zero, thereby allowing the effective current sampled by the PWM controller 160 to be approximately to the lamp current $I_L$.

Figure 12:
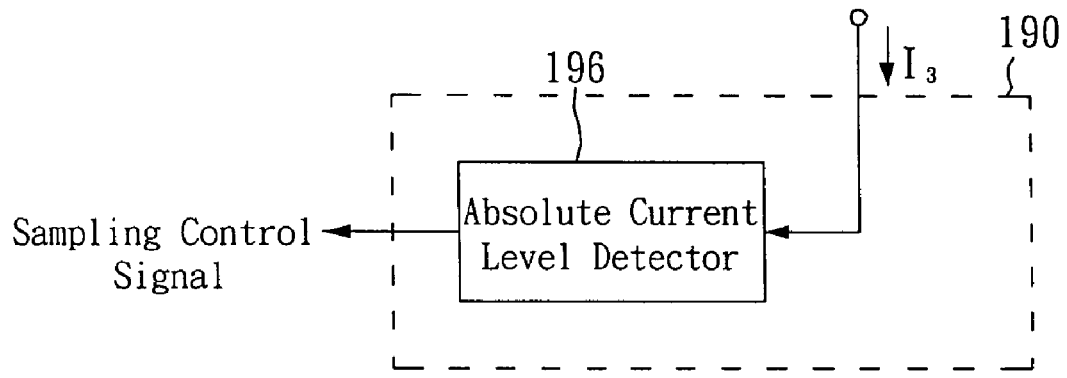
FIG. 12 shows a second exemplary circuit of an effective current sampling controller in FIG. 9.

Referring to FIG. 12 showing a second exemplary circuit of the effective current sampling controller 190, the effective current sampling controller 190 has an absolute current level detector 196. Operations of the circuit shall be described with reference to FIG. 13 showing a waveform diagram of relative voltage and current signals.

The absolute current level detector 196 is for detecting a current level of the current $I_3$ flowing through the capacitor $C_3$. When a current level of the current $I_3$ lowers and has an absolute value smaller than a predetermined value $I_T$, the absolute current level detector 196 outputs a logic high voltage signal as a sampling control signal for switching on the switch 170; otherwise, the absolute current level detector 196 outputs a logic low voltage signal as a sampling control signal for switching off the switch 170.

Figure 13:
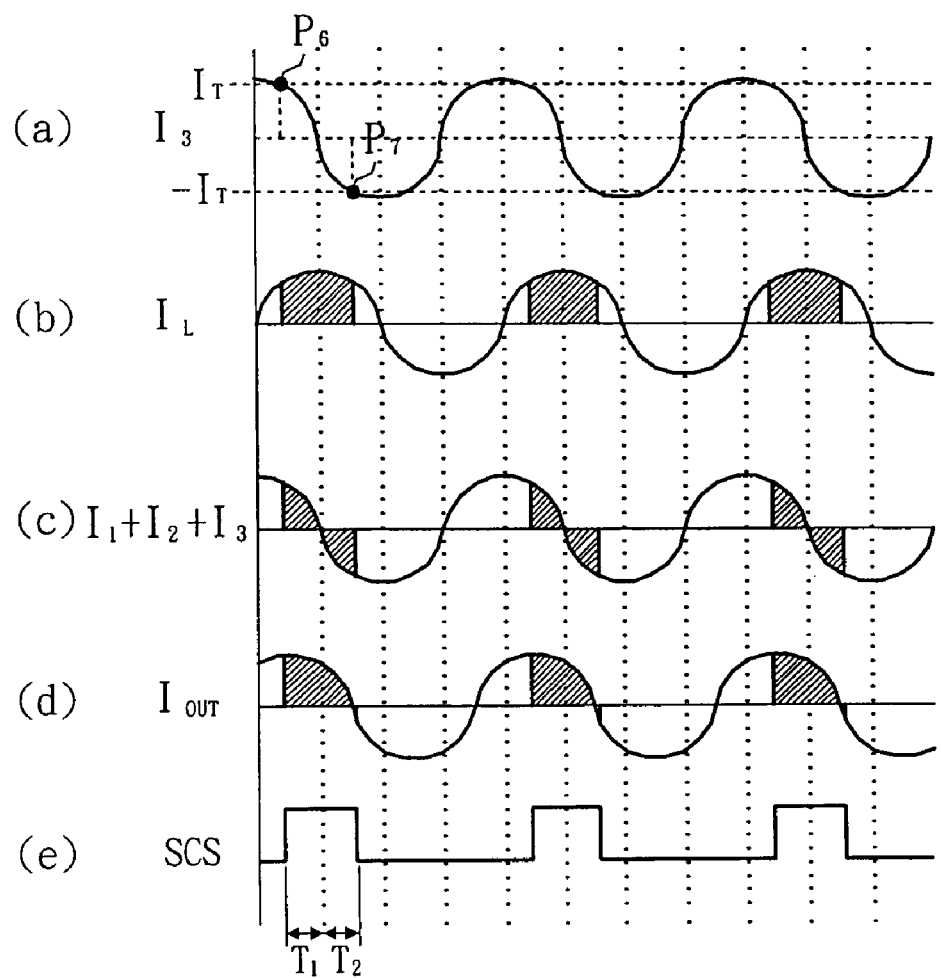
FIG. 13 shows a waveform diagram of relative voltage and current signals when the lamp driving system in FIG. 9 uses the effective current sampling controller in FIG. 12.

Thus, with reference to the waveforms in FIG. 13, within a period when the current $I_3$ drops from $I_T$ to $-I_T$, that is, within the time $T_1+T_2$ between points P6 and P7, the switch 170 is switched on such that PWM controller is enabled to sample within two same time points ($T_1=T_2$) from the zero point of the leakage current $I_1+I_2$ of the parasitic capacitance. Therefore, within the period $T_1+T_2$, the currents $I_1$, $I_2$ and $I_3$ equal to zero. To be more precise, an effective current sampled by the PWM controller 160 is exactly equal to the lamp current $I_L$.

Figure 14:
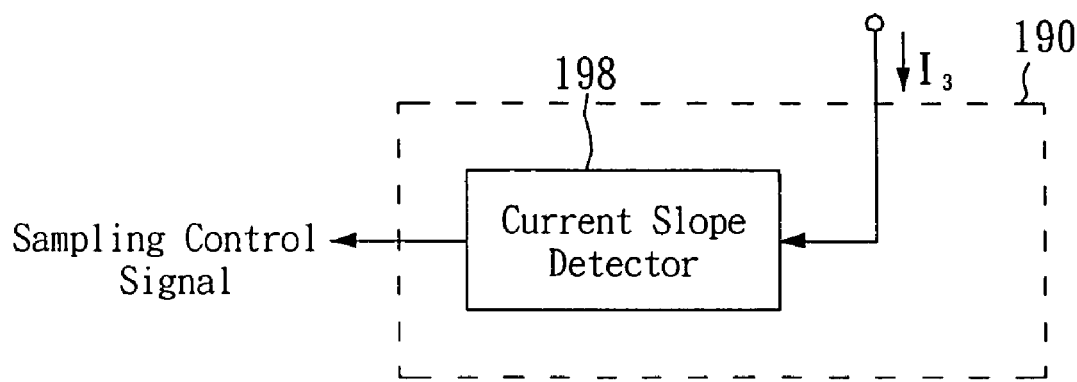
FIG. 14 shows a third exemplary circuit of an effective current sampling controller in FIG. 9.

FIG. 14 shows a third exemplary circuit of the effective current sampling controller 190 having a current slope detector 198. Operations of the circuit shall be described with reference to FIG. 15 showing a waveform diagram of relative voltage and current signals.

The current slope detector 198 is for detecting the slope of the current $I_3$ flowing through the capacitor $C_3$. When a slope of the current $I_3$ is larger than a predetermined value $S_T$, the current slope detector 198 outputs a logic high voltage signal as a sampling control signal for switching on the switch 170; otherwise, the current slope detector 198 outputs a logic low voltage signal as a sampling control signal for switching off the switch 170.

Figure 15:
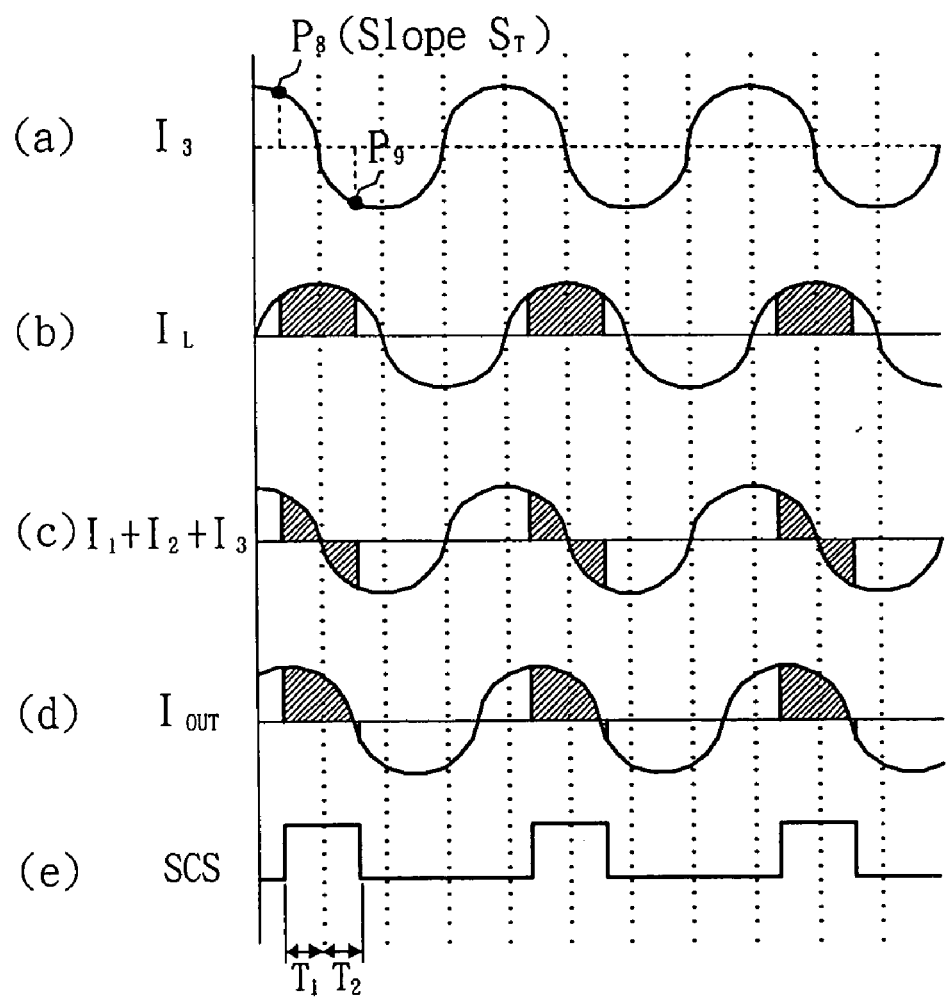
FIG. 15 shows a waveform diagram of relative voltage and current signals when the lamp driving system in FIG. 9 uses the effective current sampling controller in FIG. 14.

Thus, with reference to the waveforms in FIG. 15, within the time $T_1+T_2$ between points P8 and P9, the switch 170 is switched on such that PWM controller is enabled to sample within two same time points ($T_1=T_2$) from the zero point of the leakage current $I_1+I_2$ of the parasitic capacitance. Therefore, within the period $T_1+T_2$, the currents $I_1$, $I_2$ and $I_3$ equal to zero. To be more precise, an effective current sampled by the PWM controller 160 is exactly equal to the lamp current $I_L$.

In the lamp driving systems shown in FIGS. 4 and 9, although a node of the output end of the inverter 100 (one end of a secondary coil of the transformer) serves as a feedback point, the feedback sampling control circuit according to the invention can nevertheless be applied to a lamp driving system that uses a low voltage terminal of the lamp 200 as a feedback point, and the same aforesaid effects can also be achieved.

Figure 16:
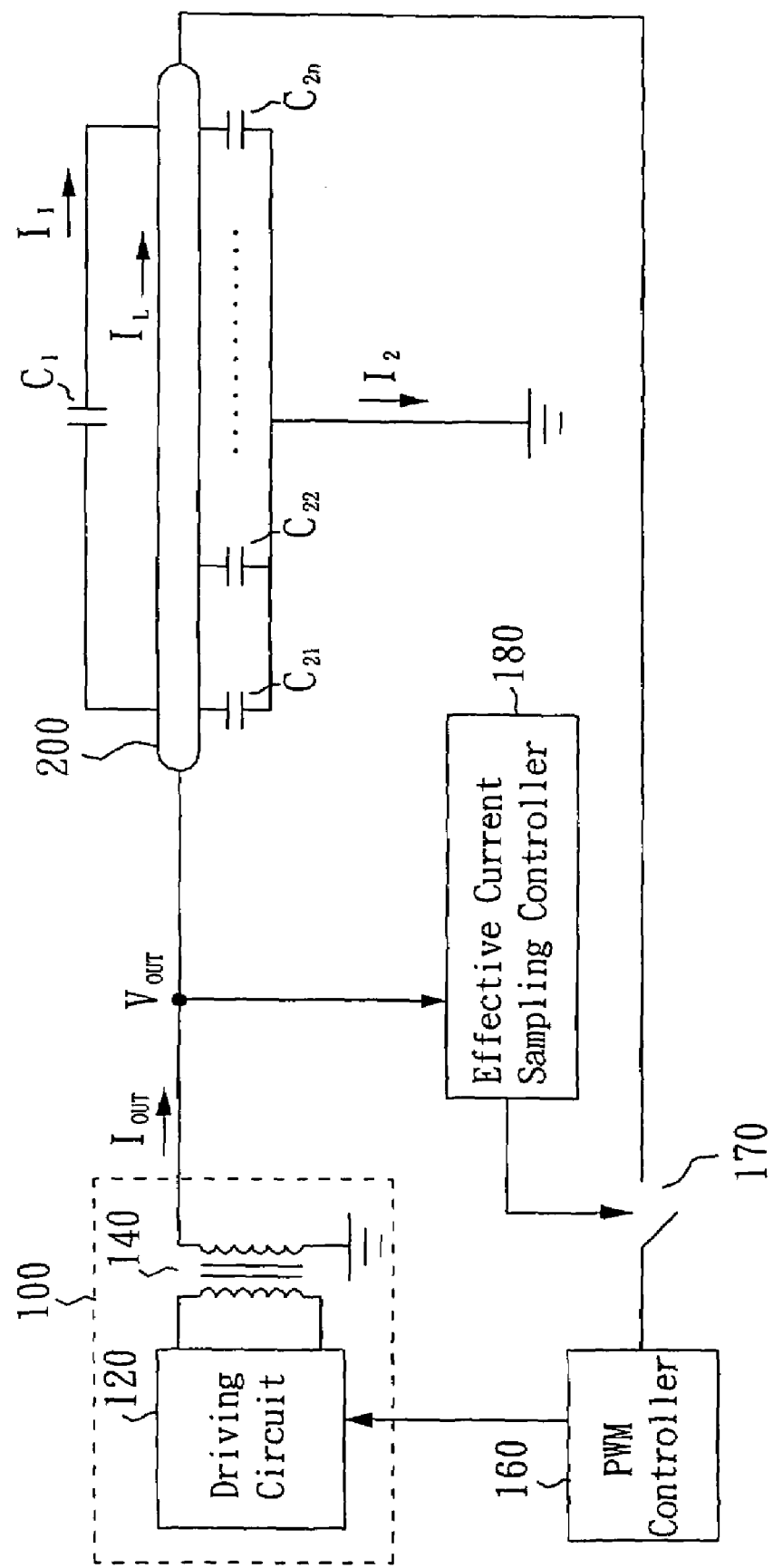
FIG. 16 shows a schematic circuit diagram of a feedback sampling control circuit for a lamp driving system in a first embodiment according to the invention, wherein a low voltage terminal of the lamp serves as a feedback point.
Figure 17:
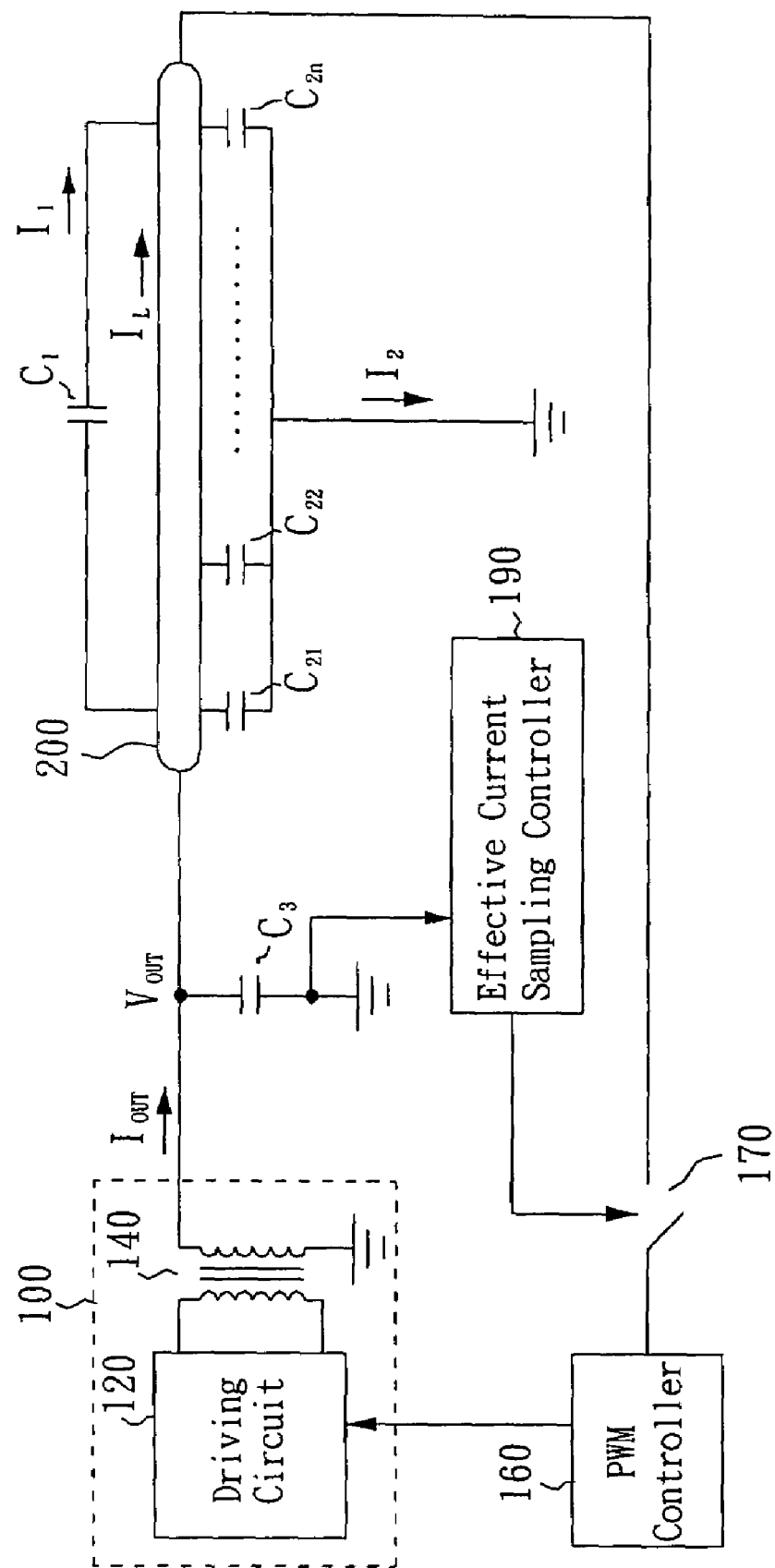
FIG. 17 shows a schematic circuit diagram of a feedback sampling control circuit for a lamp driving system in a second embodiment according to the invention, wherein a low voltage terminal of the lamp serves as a feedback point.

Referring to FIGS. 16 and 17, the feedback sampling control circuits in first and second embodiments are respectively applied to lamp driving systems using a low voltage terminal of the lamp 200 as a feedback point. In the circuits shown in FIGS. 16 and 17, the switch 170 is electrically coupled between the low voltage terminal of the lamp 200 and the PWM controller 160, so as to switch to control an effective current sampled. Operations of the circuits in FIGS. 16 and 17 are similar to those in FIGS. 4 and 9, and shall not be unnecessarily described.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. In a lamp driving system having an inverter circuit for converting a DC power to an AC power further forwarded to a lamp, and a feedback controller for adjusting said inverter circuit based on a sampling current from a feedback point, wherein said sampling current has a lamp current component and a current component of a parasitic capacitance, a feedback sampling control circuit comprising:
    a switch electrically coupled between said feedback controller and said feedback point; and
    an effective current sampling controller for controlling switching of said switch based on a signal from a high voltage terminal of said lamp thereby controlling an effective current received from said sampling current by said feedback controller and minimizing said current component of said parasitic capacitance contained in said effective current.

2. The feedback sampling control circuit as claimed in claim 1, wherein said signal is a voltage from said high voltage terminal of said lamp.

3. The feedback sampling control circuit as claimed in claim 1, wherein said feedback sampling control circuit further comprises a capacitor electrically coupled between said high voltage terminal of said lamp and ground such that said signal is a current flowing through said capacitor.

4. The feedback sampling control circuit as claimed in claim 1, wherein said feedback point is a node at an output end of said inverter.

5. The feedback sampling control circuit as claimed in claim 1, wherein said feedback point is a low voltage terminal of said lamp.

6. The feedback sampling control circuit as claimed in claim 1, wherein said inverter has a driving circuit and a transformer.

7. The feedback sampling control circuit as claimed in claim 6, wherein said feedback point is one end of a secondary coil of said transformer.

8. The feedback sampling control circuit as claimed in claim 2, wherein said effective current sampling controller has a voltage peak detector.

9. The feedback sampling control circuit as claimed in claim 2, wherein said effective current sampling controller has a DC voltage level detector.

10. The feedback sampling control circuit as claimed in claim 3, wherein said effective current sampling circuit has a zero current detector.

11. The feedback sampling control circuit as claimed in claim 3, wherein said effective current sampling circuit has an absolute current level detector.

12. The feedback sampling control circuit as claimed in claim 3, wherein said effective current sampling controller has a current slope detector.

13. In a lamp driving system having an inverter circuit for converting a DC power to an AC power further forwarded to a lamp, and a feedback controller for adjusting said inverter circuit based on a sampling current from a feedback point, wherein said sampling current has a lamp current component and a current component of a parasitic capacitance, a feedback sampling control circuit comprising:
    a switch electrically coupled between said feedback controller and said feedback point, and controlled in response to a sampling control signal;
    an effective current sampling controller electrically coupled to a high voltage terminal of said lamp and said switch to generate said sampling control signal based on a voltage signal from said high voltage terminal of said lamp, thereby controlling an effective current received from said sampling current by said feedback controller and minimizing said current component of said parasitic capacitance contained in said effective current.

14. The feedback sampling control circuit as claimed in claim 13, wherein said feedback point is a node at an output end of said inverter.

15. The feedback sampling control circuit as claimed in claim 13, wherein said feedback point is a low voltage terminal of said lamp.

16. The feedback sampling control circuit as claimed in claim 13, wherein said effective current sampling controller has a peak current detector.

17. The feedback sampling control circuit as claimed in claim 16, wherein within a period during which a peak value of said voltage signal from said high voltage terminal of said lamp is detected, said effective current sampling controller generates said sampling control signal for switching on said switch.

18. The feedback sampling control circuit as claimed in claim 13, wherein said effective current sampling controller has a DC voltage level detector.

19. The feedback sampling control circuit as claimed in claim 18, wherein when said voltage signal from said high voltage terminal of said lamp is detected to be higher than a predetermined level, said effective current sampling generates said sampling control signal for switching on said switch.

20. In a lamp driving system having an inverter circuit for converting a DC power to an AC power further forwarded to a lamp, and a feedback controller for adjusting said inverter circuit based on a sampling current from a feedback point, wherein said sampling current has a lamp current component and a current component of a parasitic capacitance, a feedback sampling control circuit comprising:
    a switch electrically coupled between said feedback controller and said feedback point, and controlled in response to a sampling control signal;
    a capacitive load electrically coupled between a high voltage terminal of said lamp and ground; and an effective current sampling controller electrically coupled to said capacitive load and said switch to generate said sampling control signal based on a current signal flowing through said capacitive load thereby controlling an effective current received from said sampling current by said feedback controller and minimizing said current component of said parasitic capacitance contained in said effective current.

21. The feedback sampling control circuit as claimed in claim 20, wherein said feedback point is a node at an output end of said inverter.

22. The feedback sampling control circuit as claimed in claim 20, wherein said feedback point is a low voltage terminal of said lamp.

23. The feedback sampling control circuit as claimed in claim 20, wherein said effective current sampling controller has a zero current detector.

24. The feedback sampling control circuit as claimed in claim 23, wherein within a period in which a zero point of said current signal flowing through said capacitive load, said effective current sampling controller generates said sampling control signal for switching on said switch.

25. The feedback sampling control circuit as claimed in claim 20, wherein said effective current sampling controller has an absolute current level detector.

26. The feedback sampling control circuit as claimed in claim 25, wherein when an absolute value of said current signal flowing through said capacitive load is detected to be lower than a predetermined level, said current effective current sampling controller generates said sampling control signal for switching on said switch.

27. The feedback sampling control circuit as claimed in claim 20, wherein said effective current sampling controller has a current slope detector.

28. The feedback sampling control circuit as claimed in claim 27, wherein when a slope of said current signal flowing through said capacitive load is detected to be higher than a predetermined slope, said effective current sampling controller generates said sampling controller signal for switching on said switch.

* * * * *